United States Patent [19]

Chuang et al.

[11] Patent Number: 5,363,376
[45] Date of Patent: Nov. 8, 1994

[54] METHOD AND APPARATUS FOR SYNCHRONIZING TIMING AMONG RADIO PORTS IN WIRELESS COMMUNICATIONS SYSTEMS

[75] Inventors: Justin C. Chuang, Holmdel; Nelson R. Sollenberger, Tinton Falls, both of N.J.

[73] Assignee: Bell Communications Research, Inc., Livingston, N.J.

[21] Appl. No.: 100,515

[22] Filed: Jul. 30, 1993

[51] Int. Cl.[5] ................. H04B 7/26; H04B 7/212; H04J 3/06
[52] U.S. Cl. .................. 370/95.3; 370/108; 375/107; 379/58; 455/54.1; 455/56.1; 455/67.3; 455/67.6
[58] Field of Search ............. 370/24, 29, 95.1, 95.3, 370/100.1, 104.1, 108; 375/106, 107, 108; 379/58, 59, 61, 63; 455/33.1, 33.2, 33.4, 34.1, 34.2, 49.1, 50.1, 51.1, 53.1, 54.1, 54.2, 56.1, 62, 63, 67.1, 67.3, 67.6, 70

[56] References Cited

U.S. PATENT DOCUMENTS

| | | | |
|---|---|---|---|
| 4,849,991 | 7/1989 | Arnold et al. | 375/84 |
| 4,937,841 | 6/1990 | Chuang et al. | 375/94 |
| 4,941,155 | 7/1990 | Chuang et al. | 375/84 |
| 5,038,399 | 8/1991 | Bruckert | 455/62 |
| 5,047,762 | 9/1991 | Bruckert | 455/63 |
| 5,084,891 | 1/1992 | Ariyavisitakul et al. | 371/42 |
| 5,155,742 | 10/1992 | Ariyavisitakul et al. | 375/13 |
| 5,177,769 | 1/1993 | Arnold et al. | 375/60 |
| 5,179,559 | 1/1993 | Crisler et al. | 370/95.1 |
| 5,203,012 | 4/1993 | Patsiokas et al. | 455/62 |
| 5,212,831 | 5/1993 | Chuang et al. | 455/54.1 |
| 5,222,101 | 6/1993 | Ariyavisitakul et al. | 375/13 |
| 5,226,045 | 7/1993 | Chuang | 370/95.3 |
| 5,278,832 | 1/1994 | Binzel et al. | 370/95.3 |

OTHER PUBLICATIONS

D. Cox, Portable Digital Radio Communications-An Approach to Tetherless Access, IEEE Communications Magazine, vol. 27, No. 7, Jul. 1989, pp. 30–40.
D. Cox, Universal Digital Portable Radio Communications, Proceedings of the IEEE, vol. 75, vol. 75, No. 4, Apr. 1987, pp. 436–476.
J. Chuang, Performance Issues and Algorithms for Dynamic Channel Assignment, Proceedings, IEEE GLOBECOM '92, Dec. 1992.
J. Chuang, Performance Limitations of TDD Wireless Personal Communications with Asynchronous Radio Ports, IEEE Electronics Letters, vol. 28, No. 6, pp. 532–536, Mar. 12, 1992.
A. Salmasi, et al, On the System Design Aspects of Code Divsion Multiple Access (CDMA) Applied to Digital Cellular and Personal Communications Networks, Proceedings, IEEE VTC'91, pp. 57–62, May 1991.
Y. Akaiwa, et al, Autonomous Decentralized Inter-Base-Station Synchronization for TDMA Microcellular Systems, in Proceedings, IEEE VT'91, pp. 257–262, May 1991.

*Primary Examiner*—Alpus H. Hsu
*Attorney, Agent, or Firm*—Leonard Charles Suchyta; Stephen M. Gurey

[57] ABSTRACT

In a TDM/TDMA digital radio communications system, time synchronization between fixed ports is achieved by adjusting the timing of a first port in response to the average timing difference between the timing of that first port and the timing measured by that first port of the downlink signals transmitted by a fixed number of the other ports in the system, which downlink signals are detected at the first port and determined to have the highest signal quality measures. Each of the other ports in the system sequentially performs the same process and the entire process is then reiterated a plurality of times at all of the ports until timing of the system converges.

32 Claims, 3 Drawing Sheets

METHOD AND APPARATUS FOR SYNCHRONIZING TIMING AMONG RADIO PORTS IN WIRELESS COMMUNICATIONS SYSTEMS

CROSS REFERENCE TO RELATED APPLICATION

This application describes and claims subject matter that is also described in our co-pending United States patent application also assigned to the present assignee hereof and filed simultaneously herewith: "METHOD AND APPARATUS FOR SYNCHRONIZING TIMING AMONG RADIO PORTS IN WIRELESS COMMUNICATIONS SYSTEMS USING HIERARCHICAL SCHEME", Ser. No. 8/100,020.

BACKGROUND OF THE INVENTION

This invention relates to time synchronization among the fixed base stations in a frequency-reusing radio communications system such as a time division multiplexed/time division multiple access (TDM/TDMA) system used for low power digital telephony.

People by their very nature are highly mobile; no where is this more true than in modern day society with its myriad forms of travel. At the same time, many people increasingly have a need to be able to telephonically communicate with others particularly while they are on "the go", i.e. while they are moving.

However, this need for mobile communications, which existed for quite some time, has remained basically unsatisfied. Since telephones traditionally have cords, any movement of the telephone was traditionally limited by the length of its cord. For many years, only a veritable handful of telephones actually traveled with their users. These mobile telephones included aeronautical, marine and other forms of early radio telephones. Inasmuch as these mobile telephones were priced well beyond the affordability of the average telephone subscriber, none of these radio telephones ever encountered widespread use. Accordingly, for the vast majority of subscribers, a telephone set was installed at each subscriber location and there it remained unless it was reinstalled elsewhere. Thus, these subscribers either remained close to their telephone and thus restricted their mobility particularly in the anticipation of receiving a telephone call, or intentionally sought out a public or private telephone located along their route of travel whenever the need arose to place a telephone call.

Now with increasing sophistication of miniaturized electronic technology and decreasing attendant cost thereof, various vendors provide a number of devices (and/or services) that offer tetherless telephony. These devices, explained in more detail below, attempt to free a subscriber from being bound by the ambulatory constraints imposed by existing wireline telephone sets. In effect, each of these devices now permits subscribers effectively, at least to a certain extent, to take their telephone with them, obtain exchange access, and remain in communication wherever they go. These devices include cordless telephones, cellular mobile radio transceivers, public packet radio data network transceivers and radio pagers. As a growing number of consumers perceived the freedom of movement offered by these devices, a large demand was created for these devices. Moreover and not unexpectedly, as the prices of these devices continue to fall due to manufacturing economies and technical developments, the demand for these devices correspondingly continues to substantially increase. Specifically, more than 25 million cordless telephone sets are in use today throughout the United States with demand for these sets continuing to rise as the price of cordless telephones with increasing sophisticated has remained within a $100.00 to $200.00 range. In addition, more than three million cellular telephone sets are currently in use throughout the United States. As the price of various cellular sets falls from more than a $1000.00 which occurred merely a year ago to only a few hundred dollars today, the demand for these sets has increased precipitously. As a result, the number of installed sets has climbed at such an astonishing rate that in certain urban areas, such as New York, the number of sets in use at peak times is beginning to strain the capacity of the existing cellular network to handle the concomitant call traffic.

While, each of the present tetherless telephonic technologies possesses certain advantages, each technology also unfortunately has certain drawbacks that significantly restrict its use. In this regard, see, e.g., Cox, "Portable Digital Radio Communications—An Approach to Tetherless Access", IEEE Communications Magazine, Vol. 27. No. 7, July 1989 pages 30–40; and Cox, "Universal Digital Portable Radio Communications", Proceedings of the IEEE, Vol. 75, No. 4, April 1987, pages 436–476.

Specifically, as to cordless telephones, such a telephone consists of two transceivers: a base unit and a handset, that collectively form a low power duplex analog radio link. The base unit is connected, typically by a subscriber to a wireline access point in a conventional telephone network in lieu of or as a replacement for a wireline telephone, in order to implement a tetherless substitute for a telephone cord. Once connected, the base unit appears to the telephone network as a conventional telephone. The base unit contains a transmitter and a receiver, and simple control and interface apparatus for dialing, accepting ringing, terminating calls and coupling voice from the telephone line to the transmitter and from the receiver within the base unit to the telephone line. The handset, which is truly portable, contains simple control logic for initiating, receiving and terminating calls with the base unit and for turning its own transmitter on and off. To provide true duplex operation, separate carrier frequencies are used by the transmitters in the base unit and handset. Since cordless telephones operate with very low input power to their transmitter, usually on the order of only several milliwatts, the handset generally utilizes several small rechargeable batteries as its power source. This enables the handset to be made relatively small, lightweight and to be continuously used for a relatively long period, typically several hours, before its batteries require recharging. Furthermore, the very low level of power radiated from the handset poses essentially no biological radiation hazard to its user.

Unfortunately, the primary disadvantage of cordless telephones is their highly limited service area. Because cordless telephones use relatively low transmitter power, these telephones have a maximum range that varies from typically a few hundred to a thousand feet, which in turn results in a very small service area. A secondary disadvantage associated with cordless telephones stems from the limited number of available frequencies. At present, only a few separate frequencies, typically up to 10 duplex channels, have been allocated by the Federal Communications Commission (FCC) for use by cordless telephones. Moreover, early cordless telephones by their very design have been very susceptible to co-channel interference. This interference arises by the simultaneous operation of two or more cordless telephones situated in close proximity to each other, such as in an immediate neighborhood of a residential area. In a very small geographic area with a very low density of users, a reasonable probability exists that within this area one or more duplex pairs will not be in use at any one time, and, as such, this interference will not occur therein. Nevertheless, in an effort to avoid this interference, relatively sophisticated cordless telephones are now capable of operating on any one of a number of preprogrammed duplex pairs with either the user or the telephone itself selecting, manually in the case of the user and automatically by the telephone, the specific pair that is to be used at any one time. Unfortunately, if a sufficient number of cordless telephones are in use in a very densely populated area, such as an apartment building, pair selection may not be sufficient to eliminate the expected incidences of co-channel interference that results from undisciplined and uncoordinated duplex pair assignment and the resulting chaos experienced by users situated therein. In addition, since cordless telephones rely on analog modulation of a duplex pair, conversations occurring over a cordless telephone are highly vulnerable to eavesdropping. Furthermore, a cordless telephone only provides limited protection against unauthorized long distance or message units calls being made therethrough. While preprogrammed digital or tone access codes are being used between individual handset-base unit pairs and provide sufficient protection against casual attempts at unauthorized access, these codes are not sufficiently sophisticated to successfully deter a determined orderly assault on a cordless telephone by an unauthorized user. Furthermore, while cordless telephones provide limited portable radio access to a wireline access point, from a network standpoint cordless telephones do not eliminate the need for telephone lines, i.e. a customer drop, to be run to each subscriber.

Nonetheless, in spite of these severe service restrictions, cordless telephones are immensely popular for the freedom, though very limited, that they furnish to their users.

In contrast to the very limited range provided by cordless telephones, cellular mobile radio systems accommodate wide ranging vehicular subscribers that move at relatively high speeds. These systems utilize a relatively high power 850 MHz transmitter, typically operating at an input of approximately 0.5 watt to several tens of watts, in a mobile unit with a relatively high efficiency antenna to access a wireline telephone network through a fixed cell-site (base station). The base station also uses a high power transmitter in conjunction with a tall antenna, typically erected on a tower or tall building, to provide a relatively large coverage area. Due to the expense, typically ranging to $300,000 exclusive of land and building costs, and the antenna size associated with each base station, the least number of base stations are often used to cover a given area. Nonetheless, this arrangement generally provides a circular service area centered on a base station with a radius of approximately 5–10 miles therefrom. In use, a cellular radio system that covers a large region often encompassing a city, its suburbs and major access highways typically includes a number of geographically dispersed base stations. The base stations, containing radio receivers and transmitters and interface and control electronics, are connected by trunks to and coordinated and controlled by one or more Mobile Telephone Switching Offices (MTSOs) that, in turn, also provide access to the conventional wireline telephone network. All of the duplex radio channels available to the entire system are sub-divided into sets of channels. The radio equipment in each base station has the capability of using channels from one of the channel sets. These sets are allocated to the base station in a pattern that maximizes the distance between base stations that use the same sets so as to minimize average co-channel interference occurring throughout a service region. One or more channels are designated for initial coordination with the mobile sets during call setup.

Each mobile (or hand-held) cellular transceiver used in the system contains a receiver and a transmitter capable of operating on any duplex radio channel available to the cellular system. Calls can be made to or from any mobile set anywhere within the large region covered by a group of base stations. The control electronics in the mobile transceiver coordinates with a base station on a special call setup channel, identifies itself, and thereafter tunes to a channel designated by the base station for use during a particular call. Each duplex channel uses one frequency for transmission from base-to-mobile and a different frequency for transmission from mobile-to-base. The signal strength of calls in progress is monitored by the base stations that can serve those calls. Specifically, when the signal strength for a given call drops below a predetermined threshold, typically due to movement of the cellular subscriber from one cell to another, the MTSO connected to that base station coordinates additional signal strength measurements from other base stations which surround the station that is currently handling the call. The MTSO then attempts to switch ("handoff") the call to another duplex channel if one of the other base stations is receiving a stronger signal than that being received at the base station that is currently handling the call. This handoff of calls, totally transparent to the cellular subscriber, preserves the quality of the radio circuit as the subscriber moves throughout the service region. Moreover, calls are handed off from one MTSO to another, as the subscriber transits from one service area into another. Inasmuch as frequency usage is coordinated, relatively efficient use is made of the available frequency spectrum while minimizing the likelihood co-channel interference. In each different geographic service area within the United States, there are two competing cellular systems using different frequencies.

Though cellular mobile radio systems provide wide range, these systems suffer various drawbacks. First, cellular systems were originally designed for use in motor vehicles whose electrical systems could readily provide sufficient power. While portable hand-held cellular transceivers do exist, they must operate with sufficient transmitter input power, typically at least 0.5 watt, to reliably reach a base station. This, in turn, requires that a relatively large battery must be used within the portable cellular transceiver. However, due to the limits of present rechargeable battery technology, the amount of time that the portable transceiver can be used before it requires recharging is often quite limited. Furthermore, the cost of these rechargeable batteries and hence of the portable transceiver is rather high. Moreover, high radiated power levels, such as that which emanate from a mobile or portable cellular transceiver, may be sufficient to pose a potential biological radiation hazard to its user. Furthermore, since cellular systems were not designed to compensate for radio attenuation occurring within buildings, these systems are only able to provide little, if any, service within a building. Low power portable cellular transceivers are not operationally compatible with large cell sizes, designed to match the needs of fast moving vehicular users, and thus often provide poor communication in many areas within these cells. In addition, since cellular systems rely on merely frequency modulating a carrier with voice or data, these systems are also susceptible to eavesdropping. Lastly, from a network perspective, cellular systems are quite inefficient. Due to the inclusion of MTSOs with trunks connected to individual base stations, backhaul of cellular traffic over wired trunks often occurs over several miles prior to its entrance into the wireline network, thereby resulting in a wasteful overbuild of network transport facilities.

Public packet radio data networks presently exist to handle infrequent bursts of digital data between a fixed base station and a number of portable data transceivers. The fixed site has a transmitter that uses several tens of watts; while each portable data transceiver uses a transmitter that operates at a level of several watts. As such, reliable coverage is provided over a service area that may extend several miles in radius from a base station. Individual base stations are connected by a fixed distribution facility to a controller that can, in turn, be connected to either a local exchange network, to handle voice-band data, or a packet-data network which itself interconnects various computers. Multiple users contend for transmission time on typically a single radio channel. Data transmissions on the channel are set up in either direction through bursts of coordinating data, handshaking, that occur between a base station and a portable data transceiver. Appropriate controller and radio link protocols are used to avoid packet collisions. Once a data transfer is complete between that base station and a data transceiver, the channel is immediately available for reuse by others. Although data bursts are transmitted at relatively high power, each burst is transmitted for only a short duration. As such, the average power consumption for a portable data transceiver is far less than that associated with a portable cellular transceiver thereby allowing physically smaller internal batteries to be used with portable data transceivers than those used in portable cellular transceivers. Nevertheless, the high radiated power levels associated with a portable data transceiver again pose a potential biological radiation hazard to its user. In addition, these networks disadvantageously suffer from limited digital transmission capacity which restricts these networks to carrying short data bursts and not voice, and, like cellular systems, experience coverage restraints when used within buildings.

In contrast to the tetherless systems discussed above, radio paging systems provide simple unidirectional transmission from a fixed location to a specifically addressed portable pager, which when received provides an alerting tone and/or a simple text message. Paging systems provide optimized one-way communication over a large region through a high power transmitter, typically a few kilowatts, that uses high antennas at multiple sites to provide reliable coverage throughout the region. Satellite based paging systems are also in operation to provide extended service regions. Since a pager is merely a receiver with a small annunciator, its power requirement is very low. As such, a pager is quite small, light weight, reliable, relatively low cost, and can operate for long intervals before its batteries need to be recharged or replaced.

Due to the advantages in size, cost and operating duration offered by pocket pagers, attempts exist in the art, to impart limited two-way communication into paging systems which are themselves highly optimized for one-way traffic. One such attempt includes incorporation of an "answer back" message through "reverse" transmission links between the individual pagers and the fixed sites. While these attempts have met with great difficulty, these attempts nevertheless indicate that a substantial demand exists for an inexpensive two-way portable truly tetherless telephonic service that overcomes the range limitations associated with cordless telephones and the weight and cost limitations associated with portable cellular systems.

Furthermore, various intelligent network services are now being offered by the local telephone operating companies in an attempt to provide wireline subscribers with a certain degree of call mobility when they are away from their own wireline telephones. These services include call transfer and call forwarding. Both call transfer and call forwarding allow a subscriber to program a local switch, using any pushbutton telephone, to transfer all subsequently occurring incoming calls that would otherwise be routed to this subscriber's telephone to a telephone associated with a different wireline telephone number that the subscriber desires anywhere in the world either for a given period of time, as in call transfer, or until that subscriber appropriately reprograms the switch with a different forwarding number, as in call forwarding. In this manner, the subscriber can, to a certain extent, continually instruct the telephone network to follow his or her movements and thereby route his or her incoming calls to a different number in unison with that subscriber's actual route of travel. Unfortunately, with these services, the subscriber must manually interact with the network and continually enter a new forwarding telephone number(s) coincident with his or her continuing travel such that the network is always cognizant of the current telephone number to which his calls are to be forwarded.

Thus, a substantial overall need exists in the art for a truly portable personal communication technology that is designed for pedestrian use and which utilizes small, lightweight and relatively inexpensive portable transceivers while eliminating, or at least substantially reducing, the performance drawbacks associated with the use of currently existing tetherless telephonic technologies in portable communication applications.

In an attempt to provide this needed technology, the art has turned to low power portable digital telephony. In essence, this technology, similar to cellular radio, uses a fixed base unit (hereinafter referred to as a port) and a number of mobile transceivers (hereinafter referred to as portables) that can simultaneously access that port on a multiplexed basis. However, in contrast to cellular radio, portable digital telephony uses low power multiplexed radio links that operate on a time division multiplexed/time division multiple access (TDM/TDMA) basis to provide a number of separate fully duplex demand-assigned digital channels between a port and each of its associated portables. Specifically, each port would transmit time division multiplexed (TDM) bit streams on a predefined carrier frequency, with, in turn, each portable that accesses that port responding by transmitting a TDMA burst on a common though different predefined carrier frequency from that used by the port. Quadrature phase shift keying (QPSK), with an inter-carrier spacing of 150 to 300 KHz and within a given operating frequency band situated somewhere between approximately 0.5 to 5 GHz would be used by both the port and portables. The power used by the transmitter in the portable would range between 5–10 milliwatts or less on average and provide a range of several hundred to a thousand feet. As such, the resulting low radiated power would pose essentially no biological radiation hazard to any user. In addition, the port antenna would be relatively small and suitable for mounting on a utility or light pole. With this transmission range, a port could simultaneously serve typically 20–30 separate locally situated portables. The same TDM channels would be reused at ports that are spaced sufficiently far apart to reduce co-channel interference to an acceptably low level but yet conserve valuable spectrum. To provide access to the wireline telephone network, each port would be interfaced, typically through a conventional fixed distribution facility, over either a copper or fiber connection to a switching machine at a local central office. The switching machine would be suitably programmed, in a similar manner as is an MTSO, to controllably and automatically handoff calls from one port to another as subscribers move their portables from port to port.

Due to the very limited transmitter power, each portable is anticipated to be very light-weight, physically small and provide a relatively long operating life between battery recharging or replacement. The cost to a subscriber for a portable is expected, through very large scale integrated (VLSI) circuit implementations, to reside in the range of $100.00 to $350.00. In addition, each port would require a relatively small electronic package and carry an overall expected cost of less than $25,000.00—which is far less, by at least an order of magnitude, than that of a current cellular base station. Moreover, the digital data canied on each channel could be readily encrypted to provide a desired degree of security and privacy against eavesdropping. Furthermore, with this technology, a port antenna, due to its small size, could be readily moved within a building to cope with signal attenuation occurring therein. Port spacings would be properly established within the building and frequency reuse would be properly controlled between these ports to provide portable service having an acceptably low level of co-channel interference to a high density of users situated therein.

From a network perspective, low power portable digital telephony is extremely attractive. At present, approximately $50–100 billion is invested by local operating telephone companies in costs associated with copper subscriber loops that run from distribution points to local telephone company demarcation points on individual customer drops. For a local telephone company, the per-subscriber cost of installing and maintaining a subscriber loop is generally greater at the loop end closest to a subscriber than at the far end thereof since the loop end is more dedicated to that subscriber than the far end is. Given the range provided by portable low power telephony, ports can be appropriately positioned throughout an area to provide radio link based exchange access and thereby substitute inexpensive mass produced VLSI circuitry for costly dedicated copper loops that would otherwise emanate from a distribution facility to an individual subscriber. Hence, by installing various ports throughout for example a building, significant labor intensive installation and maintenance tasks associated with rewiring of telephone drops and relocation of telephone equipment would be eliminated with substantial savings being advantageously realized in attendant subscriber costs as people are moved from office to office therein.

Now, with the attractiveness of low power portable digital telephony being readily apparent, its success, in great measure, hinges on achieving satisfactory performance through the use of TDMA. Various aspects of TDMA have been treated in prior art patents and patent applications such as U.S. Pat. No. 4,849,991, entitled "Method and Circuitry for Determining Symbol Timing for Time Division Multiple Access Radio Systems," issued Jul. 18, 1989 to H. W. Arnold and N. R. Sollenberger, the latter one of the co-inventors herein; U.S. Pat. No. 4,937,841, entitled "Method and Circuitry for Carrier Recovery for Time Division Multiple Access Radio Systems," issued Jun. 26, 1990 to J. C. Chuang and N. R. Sollenberger, the former the other co-inventor herein; U.S. Pat. No. 4,941,155, entitled "Method and Circuitry for Symbol Timing and Frequency Offset Estimation in Time Division Multiple Access Radio Systems," issued Jul. 10, 1990 also to J. C. Chuang and N. R. Sollenberger; U.S. Pat. No. 5,084,891, entitled "A Technique for Jointly Performing Bit Synchronization and Error Detection in a TDM/TDMA System," issued Jan. 28, 1992 to S. Ariyavisitakul, L. F. Chang and N. R. Sollenberger; U.S. Pat. No. 5,155,742, entitled "Time Dispersion Equalizer Receiver with a Time-Reversal Structure for TDMA Portable Radio Systems", issued Oct. 13, 1992 to S. Ariyavisitakul and H. W. Arnold; U.S. Pat. No. 5,177,769, entitled "Digital Circuits for Generating Signal Sequences for Linear TDMA Systems", issued Jan. 5, 1993 to H. W. Arnold and N. R. Sollenberger; U.S. Pat. No. 5,212,831, entitled "Method and Apparatus for Autonomous Adaptive Frequency Assignment in TDMA Portable Radio Systems", issued May 18, 1993 to J. C. Chuang and N. R. Sollenberger; U.S. Pat. No. 5,222,101 entitled "Phase Equalizer for TDMA Portable Radio Systems", issued Jun. 22, 1993 to S. Ariyavisitakul and H. W. Amold; and U.S. Pat. No. 5,226,045 entitled "Method and Apparatus for Autonomous Selective Routing During Radio Access in TDMA Portable Radio Systems", issued Jul. 6, 1993 to J. C. Chuang. Co-pending patent application Ser. No. 10,111 filed Jan. 28, 1993 by S. Ariyavisitakul, J. C. Chuang, and N. R. Sollenberger, discloses a method and apparatus for dynamic power control in TDMA portable radio systems.

As is readily apparent, any practical wireless access communications system will require a large number of fixed ports to provide seamless radio coverage throughout a widespread service area. Achieving time synchronization among ports is beneficial, and in many cases necessary, especially for systems providing access to the infrastructure networks, such as the local exchange networks. For example, with time synchronization, radio link transfer between two ports can be performed smoothly with minimum time overhead, which results in minimum network overhead. Time synchronization is also crucial in TDMA systems using dynamic channel selection (see, e.g., J. Chuang, "Performance Issues and Algorithms for Dynamic Channel Assignment," Proceedings, IEEE GLOBECOM'92, December 1992) and helps to reduce co-channel interference (see, e.g., J. Chuang, "Performance Limitations of TDD Wireless Personal Communications with Asynchronous Radio Ports," IEEE Electronics Letters, Vol-28, No. 6, pp. 532–534, Mar. 12, 1992). Specifically, a strong signal will interfere with only those co-channel users occupying the same time slot in a time-synchronized system; while all users occupying partially overlapped time slots are interfered with in a nonsynchronized system. For a TDMA system using frequency-division duplexing (FDD) and planned frequency reuse, synchronizing timing among ports could improve the uplink signal to interference ratio by 3–4 dB (see previous cited paper).

A popular approach for time synchronization is to use a common timing reference that is made available to each port. For example, a timing reference can be derived from information provided by (1) satellites (see, e.g., A. Salmasi and K. Gilhousen, "On the System Design Aspects of Code Division Multiple Access (CDMA) Applied to Digital Cellular and Personal Communications Networks," Proceedings, IEEE VTC'91, pp. 57–62, May 1991), or (2) the wireline distribution facilities. The first method requires installation of a GPS (Global Positioning System) receiver in every port. The second method requires accurate time delay compensation for various distribution facilities.

An alternative over-the-air autonomous time synchronization technique has been proposed by Y. Akaiwa, H. Andoh and T. Kohama in "Autonomous Decentralized Inter-base-station Synchronization for TDMA Microcellular Systems," in Proceedings, IEEE VTC'91, pp. 257–262, May 1991. In accordance with this method, each port derives timing based on a weighted sum of timing differences with respect to all other ports in the entire system. Specifically, in accordance with the Akaiwa et al method, in a system with K ports, the $i^{th}$ port, derives the timing differences with respect to all other K−1 ports separately without co-channel interference. The $i^{th}$ port then adjusts its own timing based on a weighted sum of these timing differences, the weighting function from the $j^{th}$ port being the value of the received power at the $i^{th}$ port from the $j^{th}$ port. Denoting the timing of the $i^{th}$ port as $t_i$, the new timing is calculated by the following formula:

$$t_{inew} = t_{iold} + \alpha \frac{\sum_{j \neq i} P_{ji}(t_j - t_{iold} - t_o)}{\sum_{j \neq i} P_{ji}} \quad (1)$$

where $\alpha$ is the gain factor in timing adjustment, $t_o$ is the estimated nominal time delay (propagation delay) between two ports and $P_{ji}$ is the received power of the $j^{th}$ port as measured by the $i^{th}$ port.

By weighting the received powers, a port using this method adjusts its timing mainly based on the neighboring ports. The process is iterated by the port a plurality of times and then performed and iterated at each of the other ports to reach a time synchronous state for the system. Disadvantageously, this method is sensitive to the size of the system (i.e., the number of ports). As the number of ports increases, both the time for each port to perform its measurements and calculations increases and the number of iterations required for convergence increases. Furthermore, in order to measure $P_{ji}$ and $t_j$, isolation of port j for each j is implied. Thus, in order to measure $P_{ji}$ independent of co-channel interference components, the ports other than j will need to be shut off during the procedure. Each port will then transmit one at a time to allow the $i^{th}$ port to measure each $P_{ji}$ and $t_j$ for each j. Such a method is therefore operationally impractical.

An object of the present invention is to adjust the timing of each port or fixed base station in a frequency-reusing radio communications system with a procedure that can be performed by each of the ports in the presence of co-channel interference from the other ports in the system, and thus not require a virtual shut-down of the entire system.

SUMMARY OF THE INVENTION

In accordance with the present invention, each port in a frequency-reusing radio communications system adjusts its timing by turning off only its own transmitter and listening at the possible downlink frequencies to the downlink transmissions from the other ports. At the port being time synchronized, the received signal at each downlink frequency, including co-channel interference from all ports transmitting at the same frequency, is demodulated and a quality measure and a timing measure of the signal is determined. The timing of the received signals at a plurality of different downlink frequencies, as each is adjusted by an estimated or calculated time delay due to propagation, are compared with the timing of the port. The timing differences associated with a fixed number of received signals at different downlink frequencies having the highest quality measures, and which each quality measure is above a predetermined threshold, are used to calculate an average time difference, which is then used to adjust the timing of the port. Each port then sequentially performs the same procedure to adjust its timing and then the entire process is iterated a plurality of times through all the ports to achieve a convergence of time synchronization. Initiation of the procedure at each port can be performed in response to a centralized controller connected to each port or can be pseudo-randomly determined.

DETAILED DESCRIPTION

Figure 1:
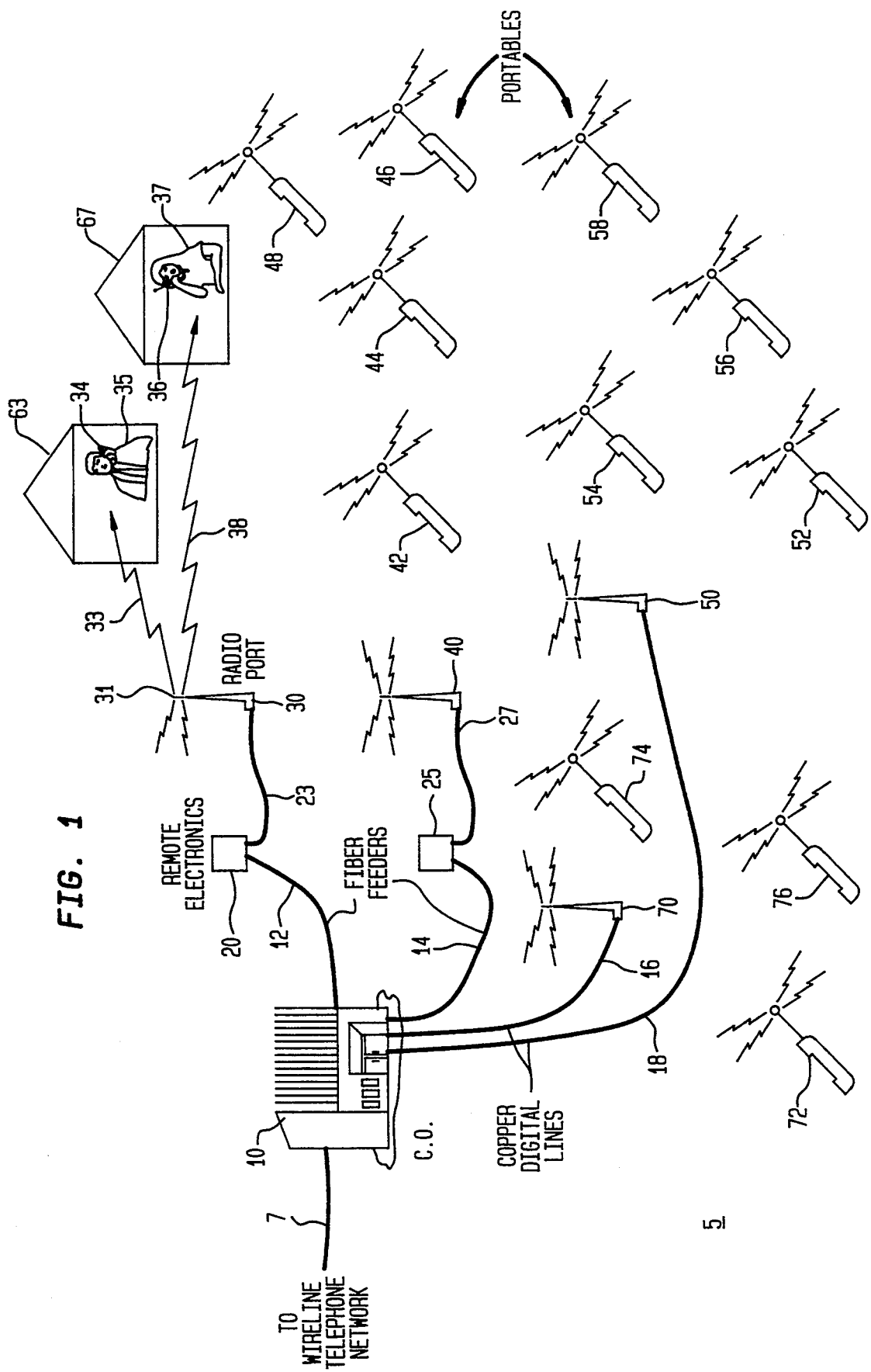
FIG. 1 shows a portable radio system using radio ports to provide tetherless communications.

An overall diagram of a low power portable TDM/TDMA digital telephony system 5 is shown in FIG. 1. Low power digital portable telephony utilizes a fixed base unit (referred to as a "port") and a number of mobile transceivers (each of which is referred to as a "portable"). Through use of time division multiple access (TDMA), each portable can access the port through a separate demand-assigned TDMA channel to carry duplex communication on a time division multiplexed (TDM) basis therebetween. The power used by the transmitter in each portable would range between 5–10 milliwatts or less on average and provide a range of several hundred to a thousand feet between a port and each of its portables. To accommodate a relatively large service area, several ports are used with individual calls being successively handed off from port to port as their corresponding callers carry their portables from the service area associated with one port to that of an adjacent port. An appropriate switch (not shown) which is located within a local central end office is suitably programmed to operate in a similar manner as does a mobile telephone switching office in order to controllably handoff calls from port to port as the callers transit corresponding local service areas associated therewith.

Specifically, system 5 contains four ports 30, 40, 50 and 70 and respective portables 34 and 36; 42, 44, 46 and 48; 52, 54, 56 and 58; and 72, 74 and 76. The ports themselves are connected to the switch located within central office 10 to provide access to a wireline telephone network. This connection can typically occur in one of two ways: either through copper digital lines 16 and 18 for illustratively ports 70 and 50, respectively, or via intermediary copper digital lines 23 and 27 to remote electronics 20 and 25 for illustratively ports 30 and 40, respectively. The remote electronics contain fixed distribution and concentration facilities for multiplexing traffic, in addition to that provided by ports 30 and 40, onto fiber feeders 12 and 14 which, in turn, feed central office 10. The switch located within the central office is connected, through trunk 7, to the wireline telephone network.

Each port would transmit time division multiplexed (TDM) bit streams on a predefined carrier frequency using quadrature phase shift keying (QPSK) modulation, with an inter-carrier spacing of 150 to 300 KHz and within a given operating frequency band situated somewhere between approximately 0.5 to 5 GHz. With this transmission range, a port could simultaneously serve as many as typically 20 separate locally situated portables that each carries digitized speech at a bit rate of 16 kbits/second. Here, ports 30, 40, 50 and 70 respectively serve portables 34 and 36; 42, 44, 46 and 48; 52, 54, 56 and 58; and 72, 74 and 76. The same TDM channels would be reused at different ports that are spaced sufficiently far apart, such as ports 30 and 70, to reduce co-channel interference to an acceptably low level but yet conserve valuable spectrum. However, adjacent ports would be situated sufficiently close together in order to provide an appropriate degree of overlap of their respective service areas thereby ensuring no loss of coverage occurs during call handoff. Furthermore, each port utilizes a suitable antenna, such as antenna 31 for port 30, to carry its TDM transmissions to its associated portables and receive TDMA bursts therefrom. Given the carrier frequencies being used, each of these antennas is relatively small and suitable for mounting on a utility or light pole or within an office building.

Inasmuch as system 5 replaces local copper drops and telephone cords with short range low power radio links, ambulatory callers are provided with completely tetherless access. Accordingly, through radio links 33 and 38, illustrative callers 35 and 37 located within respective residences 63 and 67 are completely free to move within the entire service area provided by system 5, i.e. that provided by ports 30, 40, 50 and 70, while advantageously maintaining continuity of their existing telephone conversations as well as being able to place calls through other ("non-home") ports as their travel progresses.

Each port continuously transmits on a TDM basis, while portables transmit in bursts on a TDMA basis to their associated port. Two different carrier frequencies are used to carry communication between each port and a portable: one frequency, frequency f1 for port 30, to carry communication from that port to each of its portables (downlink transmission) and another frequency, frequency f2 for port 30, to carry communication from each of these portables to this port (uplink transmission). Although adjacent ports use different pairs of frequencies, one particular uplink frequency being associated with each downlink frequency, these carrier frequencies are also reused for ports that are spaced sufficiently far apart from each other to conserve spectrum. By employing the procedure of the aforenoted U.S. Pat. No. 5,212,831 issued May 18, 1993, the downlink frequencies of all ports (and thus that port's associated uplink frequency) are assigned so as to maintain an acceptable low level of co-channel interference at each port.

As one of the portable users desires to connect to the telephone network, that person's portable must select a channel and initiate an access protocol. Selecting a channel (i.e. a port to communicate with) requires determination of the "best" port having a vacant time slot. A "best" port is one determined by the portable to have the highest signal to impairment (SIR) ratio or other quality measure. Generally, this is likely to be that port which is closest to the portable. Thus in FIG. 1, portable 74 would most likely access port 70. Various topological and meteorological conditions, however, can affect the quality of transmission so that the nearest port may not be the "best" port for a portable to access. Therefore, in FIG. 1, the "best" port for portable 74 may not be the nearest port 70, but may rather be port 40 or port 50. The "best" port may also not be available. Although the system shown in FIG. 1 shows only a limited number of portable units associated with each port, in actual practice, however, many more portables may be communicating through a port in a particularly high traffic area thereby occupying all the vacant time slots on the channel. The "best" port with respect to signal quality may not, therefore, be the "best" available port. The aforenoted U.S. Pat. No. 5,226,045 issued Jul. 6, 1993 discloses a method and apparatus for selecting a "best" available port.

Figure 2:
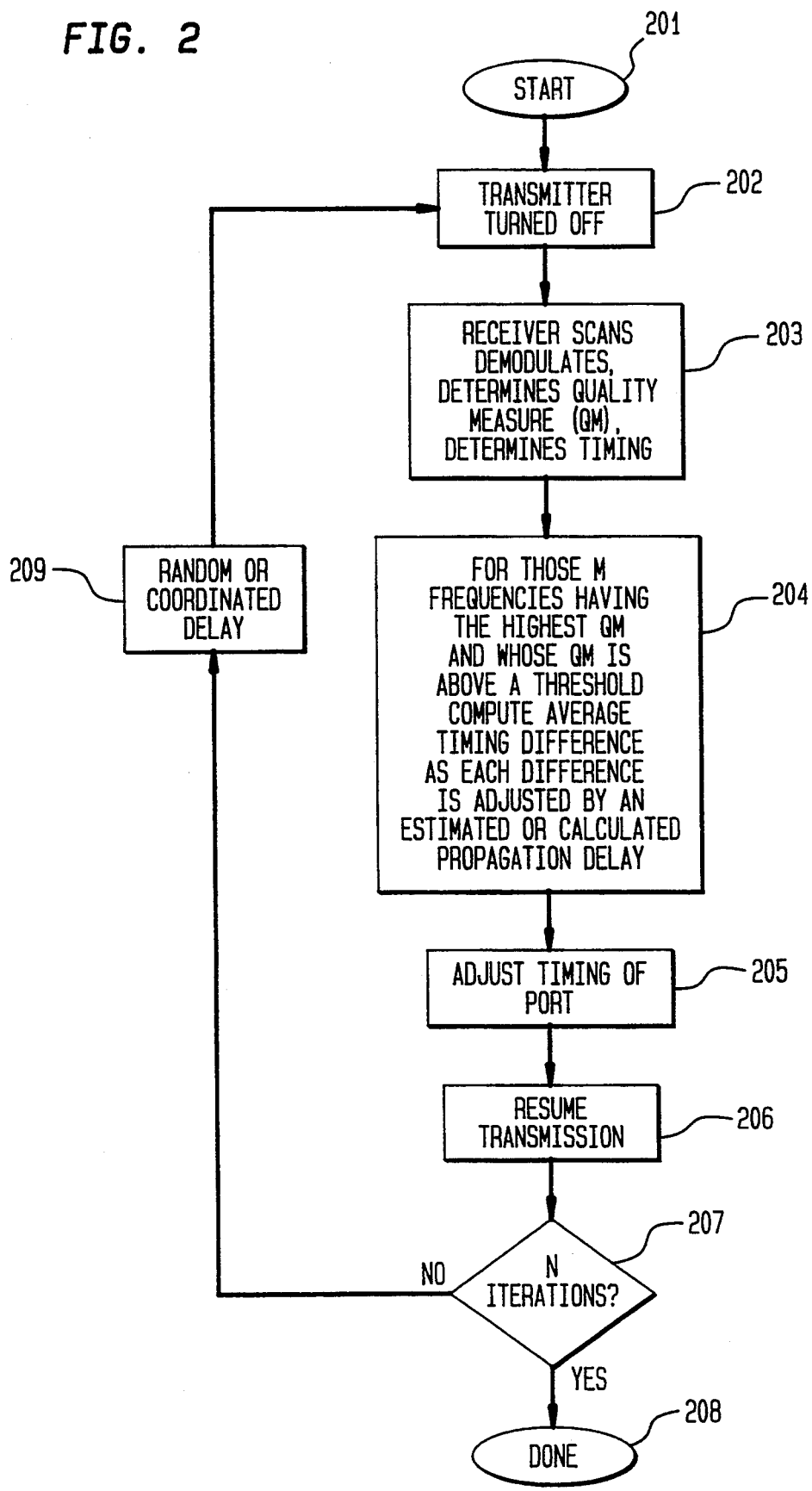
FIG. 2 is a flow chart of the time synchronization procedure of the present invention that is performed by each port in the system of FIG. 1.
Figure 3:
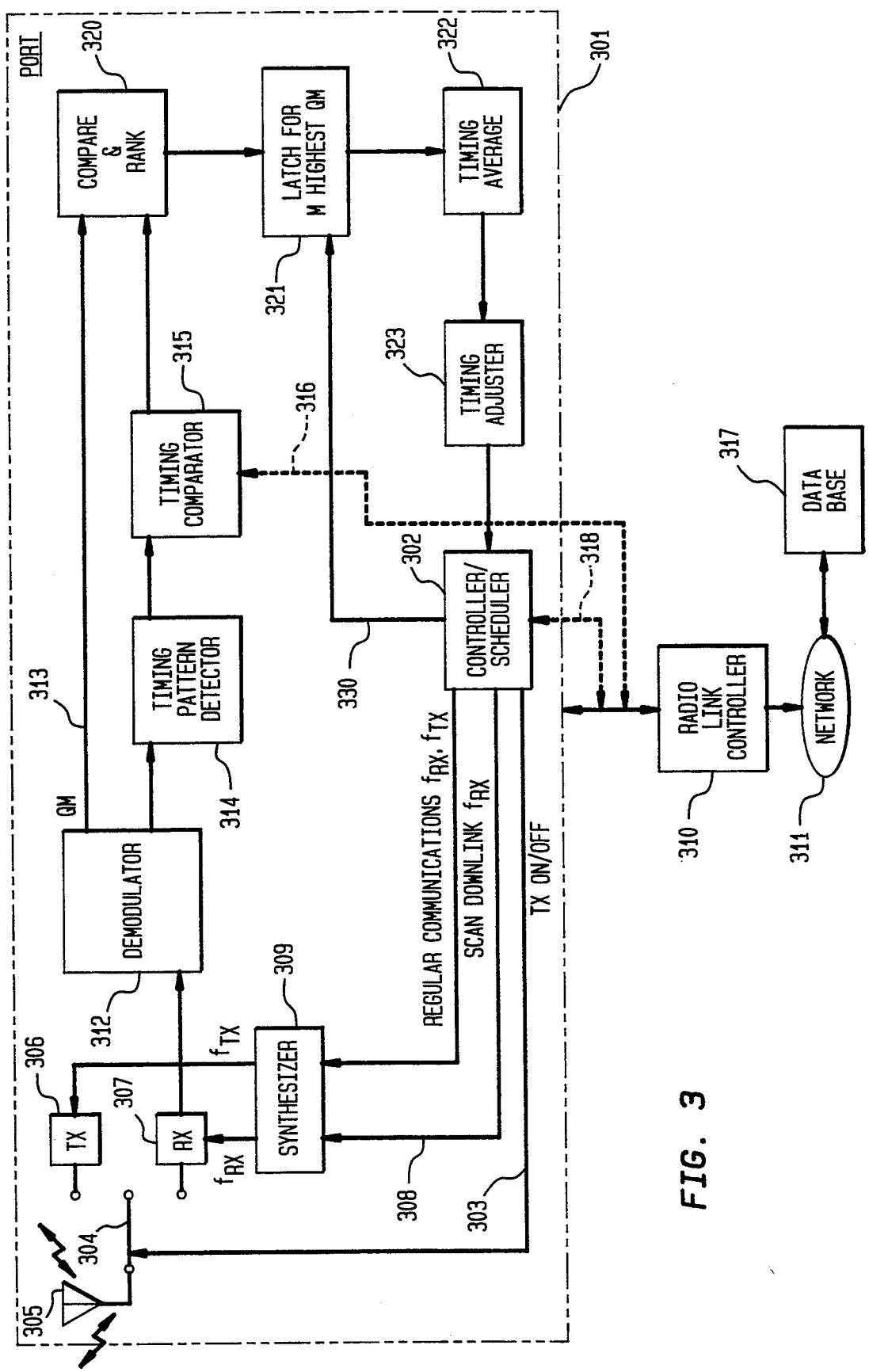
FIG. 3 is a block diagram of the equipment at each port required for performing time synchronization.

In order to employ the time synchronization process of the present invention, each port in the system (e.g., 30, 40, 50 and 70) includes the apparatus shown in FIG. 3. Before describing this apparatus, the procedure of the present invention will be described in detail. FIG. 2 shows a flowchart diagram of the steps of the time synchronization procedure of the present invention. The procedure is initiated at step 201 at a time when disruption to service is likely to be minimum, such as between the hours of 2:00 AM and 3:00 AM. At step 202, a port controller turns off its own transmitter to "listen" to the downlink transmissions from all other ports. At step 203, the port receiver scans all possible port downlink frequencies, and demodulates the signals on each channel. Each successfully demodulated signal has an associated quality measure (QM) that is directly related to the signal to impairment ratio. The QM of each demodulated signal is determined at this step. Successful demodulation on a specific frequency also yields a timing measure of the transmitting port that provides the strongest signal on that frequency, while all other ports at that same frequency contribute to the co-channel interference. This timing measure is determined at this step from the time location of a known transmitted timing pattern in the demodulated bit stream.

At step 204, for those M frequencies (e.g., 8) having the highest QM, and if each of the M highest QMs are above a predetermined threshold, an average adjusted timing difference is calculated. This QM threshold is used to preclude the timing of downlink signals which may have an unacceptable quality measure from being used to adjust the timing of the port being time synchronized. At each of these M frequencies, the timing difference is calculated from the difference between the timing measure of the demodulated signal and the internal timing of the receiving port. Each timing difference is then adjusted by an estimated or calculated propagation delay of each transmitting downlink port signal to the receiving port being adjusted. An estimated delay would be determined from a known average distance between ports as divided by the speed of light. Alternatively, the actual propagation delay can be calculated if the receiving port is linked with a centralized data base that stores the coordinates of each port within the system. Demodulation of the downlink signals will also provide identification of the port from which the signal originated. By providing the ID of the receiving ports to the data base, and from the coordinates of the receiving port being adjusted, the actual distance between each of the transmitting port and the receiving port can be calculated and the corresponding propagation delays computed.

At step 205 the timing of the port is adjusted in response to the average adjusted timing difference. At step 206 downlink transmission by the port is resumed. If N iterations of the procedure have been completed (step 207), the time synchronization is complete at that port (step 208). If N iterations have not been completed, after a random or coordinated delay (step 209), the process is repeated (back to step 202). For completely autonomous operation, this delay is set pseudo-randomly for sufficient time to allow the other ports in the system to go through the same procedure to adjust their own timing. Thus when the procedure is repeated back at the same port on a next iteration, the timing of the other ports from which that port adjusts its own timing will have changed thereby calling for a further adjustment in that port's timing. After a number of iterations, convergence and time synchronization among all the ports in the system is achieved. If each of the ports are connected to a centralized controller, the random delay of step 209 is replaced with a coordinated delay. Thus, the process is performed at each port sequentially and then iterated a plurality of times to achieve convergence, the initiation of the process at each port being determined by the centralized controller.

Although the system of FIG. 1 is very simple with only four ports 30, 40, 50 and 70, an actual system is likely to include several hundred associated ports, which necessitate close time synchronization control. By employing the procedures of the present invention, convergence of the system to a time-synchronous state is achieved.

FIG. 3 shows the additional port apparatus required to perform the abovedescribed time synchronization procedure. The port 301 includes a controller/scheduler 302. For completely autonomous time synchronization controller/scheduler 302 will automatically initiate the time synchronization procedure with randomly spaced iterations to avoid "collisions" with the other ports' time synchronization procedures. For coordinated scheduling, a radio link controller 310, which can be located in the central office (10 in FIG. 1) in the radio network interface circuitry between the various feeders (12, 14, 18 and 18 in FIG. 1) and the wireline telephone network (311 in FIG. 3), can provide a command signal via lead 318 for controller/scheduler 302 to initiate the time synchronization procedure. Time synchronization, either self-initiated by controller/scheduler 302 or initiated by radio link controller 310, commences with a signal developed on lead 303 which controls a switch 304 connecting antenna 305 and the radio transmitting (TX) and receiving (RX) circuitry 306 and 307, respectively. In response to this signal on lead 303, outgoing transmission from transmitter 306 is interrupted and receiver 307 is set to receive incoming downlink transmissions from the other ports in the system (which are actually directed to portables in the system). In response to a scan signal developed by controller/scheduler 302 on lead 308, synthesizer 309 commences to scan the signals received by receiver 307 at each possible downlink frequency, $f_{RX}$. For any given port frequency, $f_{RX}$, the received signal contains transmissions from multiple ports spread across the system, with the main component contributed by the strongest port at that frequency. The output of receiving circuitry 307 is connected to a demodulator 312. Demodulator 312 could comprise circuitry of the type described in the aforenoted U.S. Pat. No. 4,941,155 to the inventors herein. This patent is incorporated herein by reference. As described in detail in that patent, symbol timing in TDM/TDMA portable radio systems is performed by finding the particular timing instant which produces the largest vector sum of the X and Y components of expanded and collapsed differential phase angles of the received burst samples. This maximum vector sum, which is calculated by register 424 in FIG. 4 of this noted reference patent, is directly related to signal to impairment ratio (signal being transmitted from the "strongest" port to which the demodulator locks; impairment including transmissions from all other ports using that same frequency and other undesired interference such as noise) and serves as a quality measure (QM) of the received signal at a particular downlink frequency $f_{RX}$. As the receiving circuitry 307 is scanned to each possible downlink frequency, $f_{RX}$, demodulator 312 outputs the QM associated with each successive downlink frequency on lead 313.

The demodulated received burst signal at each downlink frequency is also output by demodulator 312 and input to a timing pattern detector 314. Detector 314 outputs the time position of transmitted timing marker bits, which output then represents the timing, or timing measure, of the downlink signal at $f_{RX}$. This timing measure of the received signal at the output of detector 314 is input to a timing comparator 315 which compares the timing of the received signal from another port with the corresponding timing of port 301 itself to produce a timing difference. Timing comparator 315 adjusts this timing difference, however, by the propagation delay associated with the transmission of the signal from the location of the transmitting port to the location of port 301. This propagation delay can either be estimated based on an average distance between ports, in which case the timing difference is compensated by a fixed estimated propagation delay equal to that distance divided by speed of light. Alternatively, and more accurately but more complex, timing comparator 315 can be connected (dotted line 316) through radio link controller 310 to a data base 317 associated with the network 311. By providing the identity of the transmitting port to the data base 317, which is obtainable from the demodulated bit stream, the coordinates of the transmitting port can be determined and used in conjunction with the coordinates of port 301 to calculate the actual distance and therefrom the actual propagation delay between the transmitting port and port 301. Using either the estimated or calculated propagation delay, timing comparator 315 outputs an adjusted timing difference associated with each possible port frequency $f_{RX}$.

As the synthesizer 309 scans the port frequencies, a QM and an associated adjusted timing difference are produced which are input to compare and rank circuit 320. Compare and rank circuit 320 compares and rank orders, by the magnitude of QM, the adjusted time differences associated with the scanned port frequencies. After all the downlink frequencies, $f_{RX}$, are scanned, controller 302 energizes lead 330, which is connected to latch 321. In response to the energization of lead 330 latch 321 latches the adjusted time differences associated with the M (e.g., 8) highest QM values, if the QM value is above a predetermined threshold. Time average circuit 322 calculates the time average of these M "best" adjusted time differences and inputs this average adjusted time difference to timing adjuster 323. Timing adjuster 323 is connected to controller/scheduler 302 and slides the framing structure forwards or backwards in time in accordance with this average adjusted timing difference. After a random time interval determined by controller/scheduler 302 to allow other ports in the system to adjust their timing, or in response to a signal from radio link controller 310, port 301 repeats the process. For completely autonomous time synchronization, each port iterates the process a fixed number of times independent of a centralized control. For controlled time synchronization, the radio link controller 310 controls the initiation and iteration of the process at each of the ports in the system.

In a practical sense, the timing of port 301 and every other port in the system is adjusted by the average of the adjusted timing differences between the timing of only the nearest, or "strongest" adjoining ports and the port being adjusted. Advantageously, the procedure can be performed in the presence of co-channel interference and unlike the prior art does not require the direct measurement of received power from these adjoining ports and every other port, which would require a complete shut-down of the system.

Although described in connection with a TDM/TDMA portable radio communications system, the time synchronization method of the present invention could be applied to any frequency-reusing system such as a frequency-division multiple access (FDMA) system, which is employed for cellular mobile telephony, or a code-division multiple access (CDMA) portable radio communications system.

The above-described embodiment is illustrative of the principles of the present invention. Other embodiments may be devised by those skilled in the art without departing from the spirit and and scope of the present invention.

What is claimed is:

1. A method of synchronizing timing in a frequency-reusing radio communications system having a plurality of fixed base units and a plurality of mobile transceivers, each fixed based unit having a transmitter for transmitting a downlink signal at an assigned downlink frequency to at least one mobile transceiver, a receiver for receiving an uplink signal at an associated uplink frequency from at least one mobile transceiver and for receiving downlink signals at all the downlink frequencies being transmitted by the other of the plurality of fixed base units in the system, means adjusting timing of the fixed base unit, and means for determining a quality measure and for determining a timing measure of the signals received at all the possible different downlink frequencies from the other of the plurality of fixed base units in the system, comprising the steps of:

(a) turning off the transmitter at a first base unit;
   (b) tuning the receiver at that first base unit to each possible downlink frequency;
   (c) measuring at that first base unit the quality measure and the timing measure of the downlink signals received at each of the possible downlink frequencies from the other of the plurality of transmitting fixed base units in the system;
   (d) for up to a predetermined number of downlink signals having the highest quality measures, calculating the average of the time differences between the timing measures of the downlink signals and the timing of the first base unit;
   (e) adjusting the timing of the first base unit in response to the average of the time differences calculated in step (d);
   (f) turning on the transmitter at that first base unit;
   (g) repeating steps (a) through (f) at each of the other of the plurality of base units in the system; and
   (h) after the timing of each of the plurality of base units in the system is adjusted in accordance with steps (a) through (f), repeating steps (a) through (g) a plurality of times.

2. A method in accordance with claim 1 wherein in step (h) each base unit independently waits a random time before repeating steps (a) through (f).

3. A method in accordance with claim 1 wherein a signal generated by a central controller initiates the start of steps (a) through (f) at each base unit.

4. A method in accordance with claim 1 wherein in step (d) each of the time differences is adjusted by a propagation delay from the transmitting base unit to the first base unit.

5. A method in accordance with claim 4 wherein the propagation delay is an estimated delay calculated from the average distance between fixed base units.

6. A method in accordance with claim 4 wherein the propagation delay that adjusts the time differences in step (d) is calculated separately for each transmitting base unit and is based for each on the distance between each transmitting base unit and the first base unit.

7. A method in accordance with claim 6 further comprising the steps of identifying the transmitting base units and retrieving the coordinates of the identified transmitting base units from a data base to calculate the distances between the transmitting base units and the first base unit.

8. A method in accordance with claim 1 wherein in step (d) only if the quality measure of a downlink signal received from a fixed base unit is above a predetermined threshold is the timing of the downlink signal used to calculate the average of time differences.

9. A method of synchronizing timing in a TDM/TDMA digital telephony system having a plurality of fixed ports and a plurality of mobile portable units, each port having a transmitter for transmitting a downlink signal at an assigned downlink frequency to at least one portable unit, a receiver for receiving an uplink signal at an associated uplink frequency from at least one portable unit and for receiving downlink signals at all the downlink frequencies being transmitted by the other of the plurality of ports in the system, means for adjusting timing of the port, and means for determining a quality measure and for determining a timing measure of the signals received at all the possible different downlink frequencies from the other of the plurality of ports in the system, comprising the steps of:

(a) turning off the transmitter at a first port;

(b) tuning the receiver at that first port to each possible downlink frequency;

(c) measuring at that first port the quality measure and the timing measure of the downlink signals received at each of the possible downlink frequencies from the other of the plurality of transmitting ports in the system;

(d) for up to a predetermined number of downlink signals having the highest quality measures, calculating the average of the time differences between the timing measures of the downlink signals and the timing of the first port;

(e) adjusting the timing measure of the first port in response to the average of the time differences calculated in step (d);

(f) turning on the transmitter at that first port;

(g) repeating steps (a) through (f) at each of the other of the plurality of ports in the system; and (h) after the timing of each of the plurality of ports in the system is adjusted in accordance with steps (a) through (f), repeating steps (a) through (g) a plurality of times.

10. A method in accordance with claim 9 wherein in step (h) each port independently waits a random time before repeating steps (a) through (f).

11. A method in accordance with claim 9 wherein a signal generated by a central controller initiates the start of steps (a) through (f) at each port.

12. A method in accordance with claim 9 wherein in step (d) each of the time differences is adjusted by a propagation delay from the transmitting port to the first port.

13. A method in accordance with claim 12 wherein the propagation delay is an estimated delay calculated from the average distance between ports.

14. A method in accordance with claim 12 wherein the propagation delay that adjusts the time differences in step (d) is calculated separately for each transmitting port and is based for each on the distance between each transmitting port and the first port.

15. A method in accordance with claim 14 further comprising the steps of identifying the transmitting ports and retrieving the coordinates of the identified transmitting ports from a data base to calculate the distances between the transmitting ports and the first port.

16. A method in accordance with claim 9 wherein in step (d) only if the quality measure of a downlink signal received from a fixed port is above a predetermined threshold is the timing measure of that downlink signal used to calculate the average of time differences.

17. In a frequency-reusing radio communications system having a plurality of fixed base units and a plurality of mobile transceivers, each fixed base unit having a transmitter for transmitting a downlink signal at an assigned downlink frequency to at least one mobile transceiver, a receiver for receiving an uplink signal at an associated uplink frequency from at least one mobile transceiver and for receiving downlink signals at all the downlink frequencies being transmitted by the other of the plurality of fixed base units in the system, and synchronizing apparatus for synchronizing timing, said synchronizing apparatus in each one of the plurality of base units comprising:

means for turning off the transmitter at that one base unit and for tuning the receiver to each possible downlink frequency for synchronizing the timing of that one base unit;

means for measuring the quality of the downlink signals received at each of the possible downlink frequencies from the other of the plurality of fixed base units in the system when said transmitter is off;

means for measuring the timing of the downlink signals received at each of the possible downlink frequencies from the other of the plurality of fixed base units in the system when said transmitter is off;

means for determining the timing differences between the measured timing of the downlink signals received at each of the possible downlink frequencies and the timing of the one base unit;

means for forming an average time difference of those determined timing differences associated with up to a predetermined number of downlink signals having the highest quality measures; and means for adjusting the timing of said one base unit in response to the formed average time difference.

18. A fixed base unit in accordance with claim 17 further comprising control means for controlling when said one base unit synchronizes its timing.

19. A fixed base unit in accordance with claim 18 wherein said control means repeats synchronizing the timing of said one base unit at randomly spaced times a fixed plurality of times.

20. A fixed base unit in accordance with claim 17 wherein each of the plurality of fixed base units in the system is connected to a centralized control means, said centralized control means for controlling when each of the plurality of fixed base units synchronizes its timing.

21. A fixed base unit in accordance with claim 17 wherein said means for averaging adjusts the differences of the timing of a predetermined number of downlink signals having the highest quality measures and the timing of said one base unit by the propagation delays to said one base unit from the other base units transmitting to the said one base unit.

22. A fixed base unit in accordance with claim 21 wherein each of the propagation delays is an estimated delay calculated from the average distance between fixed base units in the system.

23. A fixed base unit in accordance with claim 21 wherein each of the propagation delays is calculated separately based on the distances between each of the other base units and the one base unit.

24. A fixed base unit in accordance with claim 17 wherein said means for averaging only averages the difference of timing of a downlink signal and the timing of said one base unit if the quality measure of the downlink signal is above a predetermined threshold.

25. In a TDM/TDMA digital telephony system having a plurality of fixed ports and a plurality of mobile portable units, each port having a transmitter for transmitting a downlink signal at an assigned downlink frequency to at least one portable unit, a receiver for receiving an uplink signal at an associated uplink frequency from at least one mobile portable unit and for receiving downlink signals at all the downlink frequencies being transmitted by the other of the plurality of ports in the system, and synchronizing apparatus for synchronizing timing, said synchronizing apparatus in each one of the plurality of ports comprising:

means for turning off the transmitter at that one port and for tuning the receiver to each possible downlink frequency for synchronizing the timing of that one port;

means for measuring the quality of the downlink signals received at each of the possible downlink frequencies from the other of the plurality of ports in the system when said transmitter is off;

means for measuring the timing of the downlink signals received at each of the possible downlink frequencies from the other of the plurality of ports units in the system when said transmitter is off;

means for determining the timing differences between the measured timing of the downlink signals received at each of the possible downlink frequencies and the timing of the one port;

means for forming an average time difference of those determined timing differences associated with up to a predetermined number of downlink signals having the highest quality measures; and means for adjusting the timing of said one port in response to the formed average time difference.

26. A port in accordance with claim 25 further comprising control means for controlling when said one port synchronizes its timing.

27. A port in accordance with claim 26 wherein said control means repeats synchronizing the timing of said one port at randomly spaced times a fixed plurality of times.

28. A port in accordance with claim 25 wherein each of the plurality of ports in the system is connected to a centralized control means, said centralized control means for controlling when each of the plurality of ports synchronizes its timing.

29. A port in accordance with claim 25 wherein said means for averaging adjusts the differences of the timing of a predetermined number of downlink signals having the highest quality measures and the timing of said one port by the propagation delays to said one port from the other ports transmitting to the said one base unit.

30. A port in accordance with claim 29 wherein each of the propagation delays is an estimated delay calculated from the average distance between ports in the system.

31. A port in accordance with claim 29 wherein each of the propagation delays is calculated separately based on the distances between each of the other ports and the one port.

32. A port in accordance with claim 25 wherein said means for averaging only averages the difference of timing of a downlink signal and the timing of said one base unit if the quality measure of the downlink signal is above a predetermined threshold.

* * * * *